United States Patent Office 2,789,981
Patented Apr. 23, 1957

2,789,981

BIS-CARBAMIC ACID ESTER COMPOUNDS, AND A PROCESS OF MAKING SAME

Otto Schmid, Leonding, near Linz, Austria, assignor to Oesterreichische Stickstoffwerke Aktiengesellschaft, Linz (Donau), Austria, an Austrian joint stock company No Drawing. Application September 19, 1955, Serial No. 535,289

Claims priority, application Austria September 30, 1954

17 Claims. (Cl. 260—295.5)

This invention relates to a method of preparing new bis-carbamic acid esters.

It is known that certain synthesized carbamic acid esters of aromatic and heterocyclic oxy-compounds containing a quaternary nitrogen atom, such as derive, for instance, from m-dimethylaminophenol or 3-oxypyridine, are powerful choline-esterase inhibitors and may be used medically in place of the natural alkaloid eserine.

It has now been ascertained, in accordance with the present invention that hitherto unknown compounds of the following general formulae

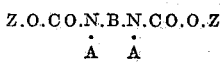

or

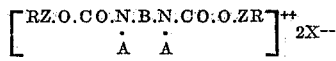

(wherein A is a lower alkylradical with 1 to 3 carbonatoms, such as a methyl, ethyl, allyl, group, B a polymethylene chain with preferably 2 to 10 CH₂ groups, Z a group containing a tertiary nitrogen atom, such as an N,N.di-substituted β-aminoethyl group, an N,N.di-substituted o-, m- or p-aminophenyl group or a pyridine group, R a saturated or unsaturated lower aliphatic hydrocarbon group such as methyl, ethyl, propyl, allyl, or alternatively a cyclohexyl, benzyl, or phenyl group, and X an anionic radical such as I, Br, Cl, or

are also very effective choline esterase inhibitors.

The pharmacological properties of these new compounds differ in various respects from the substances that have been medically used in the past. For instance, a compound prepared in accordance with the present invention and having the formula

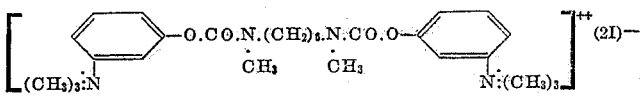

has a stronger and more enduring effect than the bromomethylate of the dimethyl carbamic acid m-dimethylaminophenyl ester (neostigmin) although its toxicity is less. Moreover, the undesirable effects (reminiscent of muscarine) exhibited by neostigmin and other compounds (effect on the intestinal motor system, salivation, activity of the heart, and so forth) are much reduced. The compounds formed, according to the present invention, by alkylation of the nitrogen atom of carbamic acid are stable in aqueous solution so that they can be heat sterilised and kept in aqueous solution without impairing their efficacy. For their practical application this is a point of significant value.

Compounds derived from 3-oxypyridine by the method of the present invention, such as compounds of the general formula

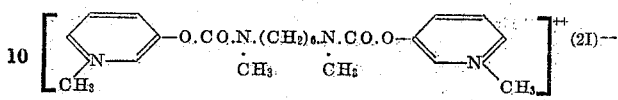

exhibit similar properties.

A compound in accordance with the present invention and having the formula

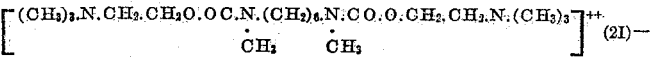

has been observed to have a strong neuro-muscular effect.

For the preparation of the compounds obtained by substitution at the nitrogen atom of carbamic acid, and having the above-written general formulas, into the carboxy groups of di-carbamic acids of the general formula

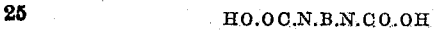

similar tertiary or quaternary groups Z or RZX containing nitrogen and substituted in the manner hereinbefore described are introduced, and the di-tertiary compounds thus obtained may be converted into quaternary compounds.

In order to carry out the synthesis, di-carbamic acid di-chlorides of the general formula

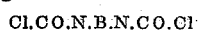

are reacted, if desired in the presence of acid-binding substances, with oxy-compounds having a tertiary nitrogen atom, of the general formula

Z.OH preferably in the form of their salts. The resultant di-tertiary compounds can be converted into the equivalent quaternary compounds with the aid of compounds of the general formula RX.

This result can also be obtained by reacting the di-carbamic acid di-chlorides with oxy-compounds containing a quaternary nitrogen atom, of the general formula

[RZ.OH]⁺X⁻

In this instance, acid-binding substances may also be added.

Suitable oxy-compounds with a tertiary nitrogen atom would be substances of the following general formulae:

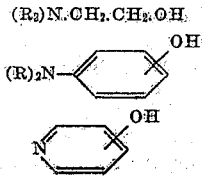

(wherein R represents similar or different groups of the kind hereinbefore specified).

If the reaction is carried out directly with oxy-compounds having a quaternary nitrogen atom, ammonia compounds are used which can be derived from the said tertiary oxy-compounds and have the following formulae:

[(R)₃N.CH₂.CH₂.OH]⁺X⁻

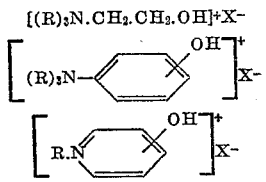

(wherein R represents similar or different groups of the kind hereinbefore specified).

The di-carbamic acid di-chlorides required as the starting material for carrying out the reaction of the present invention may be prepared in various ways. It is possible, for instance, to convert the equivalent di-secondary bases into di-carbamic di-chlorides by means of phosgene:

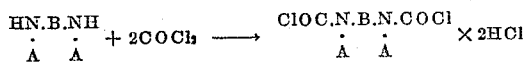

An advantageous method of performing the synthesis makes use of the di-tertiary bases which can be readily prepared. The alkyl group may be removed and a good yield of the required di-carbamic acid di-chloride obtained with the aid of phosgene as follows:

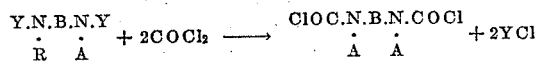

In these formulae Y represents a low alkyl group, A is a lower alkyl group with 1 to 3 carbon atoms, such as a methyl or ethyl group and B a polymethylene chain including preferably 2 to 10 CH₂ groups.

The reaction between the N.N'-di-substituted di-carbamic acid di-chlorides of the specified constitution and oxy-compounds containing a tertiary or a quaternary nitrogen atom is preferably carried out in the presence of neutral solvents, such as for instance toluene or xylene. However, their presence is not a necessity. It is often an advantage to carry out the reaction in the presence of acid-binding substances such as for example tertiary amines. Especially good results can be achieved by using the alkali compounds of the oxy-compounds with a tertiary nitrogen atom that are to be employed for the reaction, such as for instance the sodium salts of m-dimethylaminophenol or of 3-oxypyridine or the like.

The quaternisation of the di-tertiary bases di-substituted at the carbamic acid nitrogen in accordance with the present invention and having the general formula

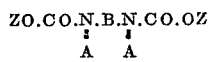

surprisingly calls for the use of only low temperatures, the reaction generally taking place at room temperature, so that the usually undesirable effects of having to work at higher temperatures are not experienced and the reaction yields very pure products. Quaternisation is preferably also carried out in neutral solvents such as acetone, methyl ethyl ketone, methanol, ethanol, or in mixtures of solvents of this kind.

The invention will be illustrated by the following examples, in which the parts referred to are parts by weight.

Example 1

15 parts of N.N.N'.N'-tetramethylhexamethylene-diamine are added dropwise to 100 parts of a solution of 40% phosgene in toluene, the solution being continuously agitated. The phosgene which escapes through an ascending cooling tube together with the evolved methyl chloride is condensed in a cold trap. As soon as immixture has been completed, the temperature is raised to 100° C. and the phosgene recovered in the trap is vaporised and bubbled through the solution again, the escaping gas being recondensed and returned once more. The repeated passage through the reagents of the phosgene that has not yet reacted is continued for 7 hours. When the solution is cool it is passed through a filter, the remaining phosgene is removed from the clear solution by distillation and the remainder distilled in vacuo. The hexamethylene-bis-(N-methyl carbamic acid chloride) comes over at a pressure of 0.2 m./m. Hg at 169° to 170° C. in the form of a limpid rather viscous oil which soon crystallises completely. The yield is 10.6 parts.

A solution of 11.9 parts of m-dimethylaminophenol in 90 parts of xylene (isomer mixture) is added to a solution of sodium methylate consisting of 2.0 parts of Na and 25 parts of methanol. The methanol is then completely removed by distillation and the temperature raised until the boiling point of the xylene is reached. 9.9 parts of hexamethylene-bis-(N-methyl carbamic chloride) are added to the remainder which contains the sodium salt of m-dimethylaminophenol in the form of solid crystals. The reagent mixture is heated and maintained at a temperature of 100° C. and continuously agitated. After having been cooled it is washed three times in water, three times in a 5% solution of caustic soda, and another three times in water. The xylene is then evaporated in vacuo and the oily residue freed of any remaining traces of xylene by allowing it to stand in air when the product crystallised completely. In this manner 15.6 parts of hexamethylene-bis-(N-methyl carbamic acid m-dimethylaminophenylester) are obtained. After re-crystallisation in methanol or acetone petroleum ether, the substance which had been slightly coloured before, reappears in the form of a white, finely crystalline powder with a micro melting point between 88.5° and 90° C.

33.4 parts of hexamethylene-bis-(N-methyl carbamic acid m-dimethylaminophenylester) are dissolved in 85 parts of methyl ethyl ketone, and 100 parts of absolute ethanol and 50 parts of methyl iodide are then added. After the solution has been allowed to stand for 4 days at room temperature methyl ethyl ketone is added to the point of incipient clouding and the solution left at room temperature for another 8 days. The finely crystalline precipitate is drawn off, washed in methyl ethyl ketone, and dried in vacuo. 32.6 parts of hexamethylene-bis-(N-methyl carbamic acid m-dimethylaminophenyl-ester-iodomethylate) are obtained. The further addition of methyl ethyl ketone yields a little more of the substance which may be purified by dissolving for instance in absolute ethanol and subsequent precipitating with methyl ethyl ketone and appears as a white, finely crystalline, powder with a micro melting point between 138° and 139.5° C.

After quaternisation of the hexamethylene-bis-(N-methyl carbamic acid m-dimethylaminophenylester) with other alkylation reagents, such as an ethyl halogenide, an allyl halogenide, or a benzyl halogenide, the corresponding bis-quaternary compounds can be prepared. The iodides and bromides react readily and produce the quaternary compounds at room temperature. The chlorides often call for the application of heat to avoid long reaction times for quaternisation.

Example 2

The octamethylene-bis-(N-methyl carbamic acid chloride) is prepared in the same way as the hexamethylene-bis-(N-methyl carbamic acid chloride) described in Example 1. The raw product obtained after removing the toluene by distillation can be used in the further reaction without purification.

The crude octamethylene-bis-(N-methyl carbamic acid chloride) prepared from 19 parts of N.N.N'.N'-tetramethyloctamethylenediamine is reacted with 30 parts of the sodium salt of m-dimethylaminophenol suspended in xylene at a temperature of 100° C., by stirring the mixture for 4 hours. The cooled product of the reaction is washed in water, a 5% solution of caustic soda, and again in water whereupon the xylene is removed by evaporation in vacuo. 26 parts of octamethylene-bis-(N-methyl carbamic acid m-dimethylaminophenylester) are thereby obtained.

10.9 parts of octamethylene-bis-(N-methyl carbamic acid m-dimethylaminophenylester) are dissolved in 40 parts of benzene and then boiled under reflux in the presence of animal charcoal for one hour. After filtration, the benzene is removed by distillation. The residue is dissolved in 100 parts of a methyl bromide solution in acetone containing 13 parts of methyl bromide and then allowed to stand at room temperature for four days. The crystalline precipitate is drawn off, washed in acetone, and dried in vacuo. In this manner 12.4 parts of octamethylene-bis-(N-methyl carbamic acid m-dimethylaminophenylester-bromomethylate) are obtained. The product precipitated from a solution in acetic acid with methyl ethyl ketone is a white, finely crystalline, powder with a melting point between 150° and 154° C.

*Example 3*

The decamethylene-bis-(N-methyl carbamic acid m-dimethylaminophenylester-bromomethylate) is obtained in a similar manner to that described in Example 2 in connection with the preparation of the octamethylene-bis-(N-methyl carbamic acid m-dimethylaminophenylester-bromomethylate). The decamethylene-bis-(N-methyl carbamic acid m-dimethylaminophenylester-bromomethylate) appears after precipitation from a solution in acetic acid with methyl ethyl ketone in the form of a finely crystalline powder with a micro melting point between 164 and 170° C.

*Example 4*

15 parts of N.N.N'.N'-tetramethyl-hexamethylene-diamine are added dropwise to 100 parts of a 35% solution of phosgene in toluene and the reagent mixture is kept at a temperature of 100° C. for 6 hours, the escaping unreacted phosgene being condensed and repeatedly bubbled through the reagent mixture again. After standing for 12 hours the mixture is filtered and 60 parts of the clear toluene solution removed by distillation. 40 parts of β-dimethylaminoethanol are then added to the remaining solution of the hexamethylene-bis-(N-methyl carbamic acid chloride) in toluene. When heated a precipitate appears. After standing for 12 hours at room temperature the deliquescent crystals of the precipitate (hydrochloride of dimethylaminoethanol) are separated. The remaining toluene is removed by warming the solution lightly in vacuo and in order to get rid of the excess of di-methylaminoethanol the residue is left for one week in an open dish in vacuo over concentrated sulphuric acid. In this manner 21 parts of hexamethylene-bis-(N-methyl carbamic acid dimethylaminoethylester) are prepared in the form of a practically odourless oil.

21 parts of this hexamethylene-bis-(N-methyl carbamic acid dimethylaminoethylester) are dissolved in 125 parts of acetone and 40 parts of methyl iodide added. The reaction occurs when the solution is heated. Soon, fine white crystals appear which are drawn off after having been left to stand at room temperature for 12 hours, washed in acetone and then dried. In this manner 35.3 parts of hexamethylene-bis-(N-methyl carbamic acid choline iodideester) are obtained which, after dissolving in methanol and subsequent precipitation with acetone have a micro melting point between 169° and 171° C.

*Example 5*

2 parts of sodium are dissolved in 24 parts of methanol and to the solution of sodium methylate formed 8.25 parts of 3-oxypyridine and 90 parts of xylene (mixture of isomers) are added. Then the mixture is distilled in an atmosphere of nitrogen as protecting gas until the boiling point of xylene is reached and the methanol is completely removed. The remainder is brought together with a solution of 11.7 parts of hexamethylene-bis-(N-methyl carbamic acid chloride) in 45 parts of xylene and maintained 4 hours at a temperature of 80° C. under vigorous stirring.

After having been cooled it is washed three times in water, three times in a 5% solution of caustic soda, and then another three times in water. The solution in xylene is dried over sodium sulfate and the xylene is completely distilled off in vacuo. Thus 11.0 parts of hexamethylene-bis-(N-methyl carbamic acid-3-pyridyl ester) are obtained.

6 parts of hexamethylene-bis-(N-methyl carbamic acid-3-pyridyl ester) are dissolved in 8 parts of acetone and the solution is mixed with 10 parts of methyl iodide and left at room temperature. When the reaction is finished, the crystalline hexamethylene-bis-(N-methyl carbamic acid-3-pyridyl ester-iodomethylate) precipitated is drawn off, washed in acetone and dried. The raw product thus obtained is re-crystallised in 24 parts of 96% ethanol and yields 7.5 parts of hexamethylene-bis-(N-methyl carbamic acid-3-pyridyl ester-iodomethylate) with a melting point of 152° to 157° C.

7.3 parts of hexamethylene-bis-(N-methyl carbamic acid-3-pyridyl ester) are dissolved in 120 parts of acetone, then 22 parts of methyl bromide are added and the mixture is left to stand at room temperature until the reaction is finished, whereby crystals are precipitated. The reaction product after being drawn off and dried (9.9 parts) can be purified by dissolving in acetic acid and precipitating with methyl ethyl ketone. The hexamethylene-bis-(N-methyl carbamic acid-3-pyridyl ester bromomethylate) has a micro melting point between 147° and 150° C.

*Example 6*

The substance is prepared in an analogous manner as described in the preceding example for hexamethylene-bis-(N-methyl carbamic acid-3-pyridyl ester), by using decamethylene-bis-(N-methyl carbamic acid chloride) instead of hexamethylene-bis-(N-methyl carbamic acid chloride). In this case there are obtained 10.1 parts of decamethylene-bis-(N-methyl carbamic acid-3-pyridyl ester) from 10 parts of decamethylene-bis-(N-methyl carbamic acid chloride).

13.1 parts of decamethylene-bis-(N-methyl carbamic acid-3-pyridyl ester) are dissolved in 8 parts of absolute ethanol and 200 parts of acetone, then 40 parts of methyl bromide are added to the solution and the mixture is left to stand at room temperature. After the end of the reaction the decamethylene-bis-(N-methyl carbamic acid-3-pyridyl ester bromomethylate) obtained in crystalline form is dissolved in absolute ethanol and precipitated with methyl ethyl ketone; thus 9.4 parts of the product with a micro melting point between 100° and 103° C. are obtained.

*Example 7*

4.7 parts of hexamethylene-bis-(N-methyl carbamic acid m-dimethylaminophenylester) are dissolved in 40 parts of methyl ethyl ketone and to the solution 3.15 parts of dimethyl sulfate are added. After standing for several hours at room temperature the hexamethylene-bis-(N-methyl carbamic acid m-dimethylaminophenyl-ester-methosulfate) is obtained in the form of a viscous oil.

*Example 8*

4.7 parts of hexamethylene-bis-(N-methyl carbamic acid m-dimethylaminophenylester) are dissolved in 40 parts of methyl ethyl ketone and to the solution 6.3 parts of ethyl iodide are added. After standing for several days at a temperature of 25° to 30° C. the hexamethylene-bis-(N-methyl carbamic acid m-dimethyl-aminophenylester-iodoethylate) formed can be precipitated with precipitating agents convenient for such quaternary products, as e. g. benzene.

*Example 9*

5.0 parts of octamethylene-bis-(N-methyl carbamic acid m-dimethyl-aminophenylester) are dissolved in 35 parts of methyl ethyl ketone. To this solution a solution of 3.8 parts of p-toluene sulfonic acid methylester in 20 parts of methyl ethyl ketone is added and the reaction mixture is maintained at a temperature of 60° C. for 9 hours. The octamethylene-bis-(N-methyl carbamic acid m-dimethyl-aminophenylester p-toluenesulfonate) is thrown out in the form of a viscous oil.

Equimolecular amounts of o-dialkyl aminophenols or p-dialkyl aminophenols or other m-dialkyl aminophenols respectively can be used instead of the m-dimethyl aminophenol applied according to the preceding examples, giving similar results. As examples for such dialkyl aminophenols m-diethyl aminophenol, m-dipropyl aminophenol, m-diisobutyl aminophenol, m-di-n-butyl aminophenol, m-methyl ethyl aminophenol, and the corresponding o- or p-dialkyl aminophenols, further also di-cyclhexyl aminophenols, di-benzyl aminophenols and similar compounds may be mentioned.

*Example 10*

Hexamethylene - bis - (N-methyl carbamic acid m-dimethyl-aminophenylester-bromomethylate) is obtained in the same manner as described in Example 1 by quaternisation of hexamethylene-bis-(N-methyl carbamic acid m-dimethyl-aminophenylester) with methyl bromide instead of methyl iodide. After purification by dissolving in acetic acid and precipitating with methyl ethyl ketone the substance has a micro melting point of 170° to 173° C.

I claim:

1. A bis-quaternary salt of a carbamic acid ester of the formula

wherein Z is a tertiary amine radical selected from the group consisting of

and

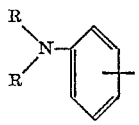

A represents a radical selected from the group consisting of lower alkyl radicals with 1 to 3 carbon atoms, B represents a polymethylene radical with 2 to 10 carbon atoms, while R is a member selected from the group consisting of a lower alkyl radical with 1 to 3 carbon atoms, a cyclohexylradical and a benzylradical.

2. A bis-quaternary salt of a carbamic acid ester of the formula

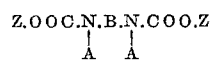

wherein Z is a dimethylamino-phenylradical, A represents a radical selected from the group consisting of lower alkyl-radicals with 1 to 3 carbon atoms and B represents a polymethylene radical with 2 to 10 CH$_2$-groups.

3. A bis-quaternary salt of a carbamic acid ester of the formula

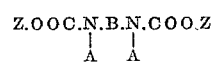

wherein Z is a pyridylradical, A represents a radical selected from the group consisting of lower alkyl-radicals with 1 to 3 carbon atoms and B represents a polymethylene radical with 2 to 10 CH$_2$-groups.

4. A bis-quaternary salt of a carbamic acid ester of the formula

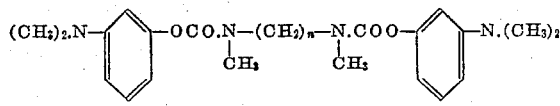

wherein $n$ is an integer from 2 to 10.

5. A bis-quaternary salt of a carbamic acid ester of the formula

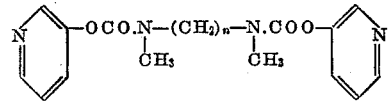

wherein $n$ is an integer from 2 to 10.

6. A carbamic acid ester of the formula

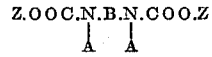

wherein Z is a tertiary amine radical selected from the group consisting of

and

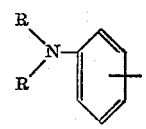

A represents a radical selected from the group consisting of lower alkyl radicals with 1 to 3 carbon atoms, B represents a polymethylene radical with 2 to 10 carbon atoms, while R is a member selected from the group consisting of a lower alkyl radical with 1 to 3 carbon atoms, a cyclohexylradical and a benzylradical.

7. A carbamic acid ester of the formula

wherein Z is a dimethylamino-phenylradical, A represents a radical selected from the group consisting of lower alkylradicals with 1 to 3 carbon atoms and B represents a polymethylene radical with 2 to 10 CH$_2$-groups.

8. A carbamic acid ester of the formula

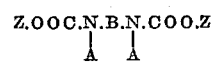

wherein Z is a pyridylradical, A represents a radical selected from the group consisting of lower alkylradicals with 1 to 3 carbon atoms and B represents a polymethylene radical with 2 to 10 CH$_2$-groups.

9. A carbamic acid ester of the formula

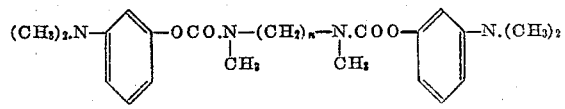

wherein $n$ is an integer from 2 to 10.

10. A carbamic acid ester of the formula

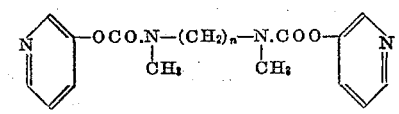

wherein $n$ is an integer from 2 to 10.

11. In a process of producing a bis-quaternary salt of a carbamic acid ester of the general formula

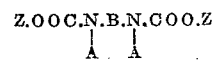

wherein Z is a tertiary amine radical selected from the group consisting of

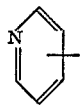

and

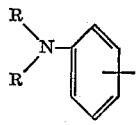

A represents a radical selected from the group consisting of lower alkyl radicals with 1 to 3 carbon atoms, B represents a polymethylene radical with 2 to 10 carbon atoms, while R is a member selected from the group consisting of lower alkyl radicals with 1 to 3 carbon atoms, a cyclohexylradical and a benzylradical, the step comprising reacting dicarbamic acid dichlorides of the general formula

with a hydroxy compound of the formula ZOH, where Z corresponds to the above indicated designation, in an indifferent solvent, and then reacting the resulting bis-tertiary carbamic acid ester with a quaternizing agent of the formula RX wherein R corresponds to the above indicated designation and X is an anionic group, in an indifferent solvent and in an amount sufficient to form said bis-quaternary carbamic acid ester compound.

12. In a process of producing a bis-quaternary salt of a carbamic acid ester of the general formula

wherein Z is a tertiary amine radical selected from the group consisting of

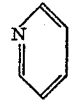

and

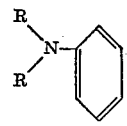

A represents a radical selected from the group consisting of lower alkyl radicals with 1 to 3 carbon atoms, B represents a polymethylene radical with 2 to 10 carbon atoms, while R is a member selected from the group consisting of lower alkyl radicals with 1 to 3 carbon atoms, a cyclohexylradical and a benzylradical, the step comprising reacting dicarbamic acid dichlorides of the general formula

with a hydroxy compound of the formula

in an indifferent solvent, wherein R and Z correspond to the above indicated designation and X is an anionic group.

13. As a new product the decamethylene-bis-quaternary carbamic acid ester compound of the general formula

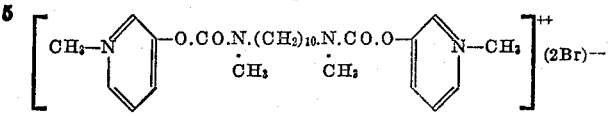

said compound having a micro melting point of 100–103° C.

14. As a new product the octamethylene-bis-quaternary carbamic acid ester compound of the general formula

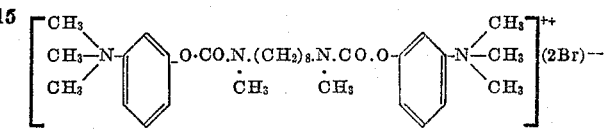

said compound having a melting point of 150–154° C.

15. As a new product the decamethylene-bis-quaternary carbamic acid ester compound of the general formula

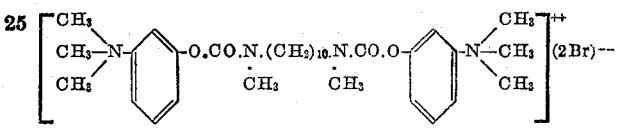

said compound having a micro melting point of 164–170° C.

16. As a new product the hexamethylene-bis-quaternary carbamic acid ester compound of the general formula

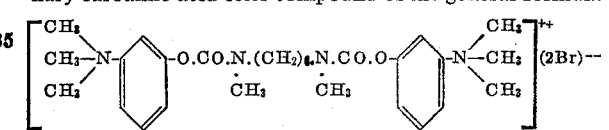

said compound having a micro melting point of 170–173° C.

17. As a new product the hexamethylene-bis-quaternary carbamic acid ester compound of the general formula

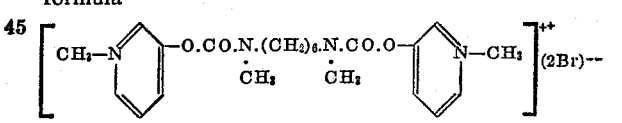

said compound having a micro melting point of 147–150° C.

References Cited in the file of this patent

UNITED STATES PATENTS 2,208,485  Aeschlimann _____ July 16, 1940

OTHER REFERENCES

Herring et al.: Journal of Pharmacology and Experimental Therapeutics, vol. 103, p. 347 (1951).

Kraup et al.: Nauyn-Schmiedebergs Archiv., Fur Experimentelle Pathologie und Pharmakologie Bd 122, pp. 180–182 (1954).